United States Patent
Rosson et al.

(10) Patent No.: US 9,998,171 B2
(45) Date of Patent: Jun. 12, 2018

(54) IBFD TRANSCEIVER WITH NON-RECIPROCAL FREQUENCY TRANSPOSITION MODULE

(71) Applicant: Commissariat A L'Energie Atomique et aux Energies Alternatives, Paris (FR)

(72) Inventors: Patrick Rosson, Biviers (FR); Antonio Clemente, Seyssins (FR); David Dassonville, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days. days.

(21) Appl. No.: 15/397,324

(22) Filed: Jan. 3, 2017

(65) Prior Publication Data
US 2017/0195003 A1 Jul. 6, 2017

(30) Foreign Application Priority Data
Jan. 4, 2016 (FR) .................................... 16 50011

(51) Int. Cl.
*H04B 1/56* (2006.01)
*H04B 1/48* (2006.01)
*H04L 5/14* (2006.01)

(52) U.S. Cl.
CPC ............... *H04B 1/56* (2013.01); *H04B 1/48* (2013.01); *H04L 5/14* (2013.01); *H04B 2001/485* (2013.01)

(58) Field of Classification Search
CPC ............... H04B 1/56; H04B 1/48; H04L 5/14
See application file for complete search history.

(56) References Cited

U.S. PATENT DOCUMENTS

| 8,036,627 B2 | 10/2011 | Teillet et al. |
| 2013/0271346 A1 | 10/2013 | Dussopt et al. |
| 2015/0333847 A1* | 11/2015 | Bharadia ................ H04B 15/00 455/63.1 |

FOREIGN PATENT DOCUMENTS

WO WO 2015/021481 A2 2/2015

OTHER PUBLICATIONS

French Preliminary Search Report dated Jun. 2, 2016 in French Application 16 50011, filed on Jan. 4, 2016 ( with English Translation of Categories of Cited Documents).
Ashutosh Sabharwal et al. "In-Band Full-Duplex Wireless: Challenges and Opportunities", IEEE Journal on Selected Areas in Communications, vol. 32, No. 9, Sep. 2014, 22 pages.
Dinesh Bharadia et al. "Full Duplex Radios", Proc. of SIGCOMM '13, 2013, 12 pages.

* cited by examiner

*Primary Examiner* — Siming Liu
(74) *Attorney, Agent, or Firm* — Oblon, McClelland, Maier & Neustadt, L.L.P.

(57) ABSTRACT

A transceiver for In-Band Full-Duplex communication is provided. The transceiver includes a duplexer and a bidirectional frequency transposition module, the frequency transposition module being suitable for transposing a signal to be transmitted, with a predetermined frequency shift, $\Delta F$, in order to obtain a transmit signal, and for transposing the receive signal, with the same frequency shift, in order to obtain the received signal, with the frequency band of the signal to be transmitted and the frequency band of the received signal thus being separated by a frequency shift which is double the predetermined frequency shift.

10 Claims, 7 Drawing Sheets

IBFD TRANSCEIVER WITH NON-RECIPROCAL FREQUENCY TRANSPOSITION MODULE

TECHNICAL FIELD

The present invention concerns in general the field of IBFD (In-Band Full-Duplex) type communication systems, in other words systems which simultaneously use the same frequency band for transmit and receive. The present invention applies to both cable communications and wireless communications.

STATE OF THE PRIOR ART

The scarcity of spectral resources has in recent times given rise to renewed interest in IBFD (In-Band Full-Duplex) communications. Unlike full-duplex or FDD (Frequency Division Duplexing) communications which call upon separate transmit and receive frequencies, IBFD communications use a given frequency band simultaneously for transmitting and for receiving.

A general description of IBFD communication systems may be found in the article by A. Sabharval et al. entitled "In-Band Full-Duplex wireless: challenges and opportunities" published in the IEEE Journal on Selected Areas in Communications, Vol. 32, No. 9, September 2014, pp. 1637-1652.

Despite the gain in spectral efficiency, IBFD communication systems nevertheless suffer from a high degree of self-interference. This interference is essentially due to circulator leakage between the transmit and receive channels (circulator insulation defect), or to the unsuitability of the antenna (reflection of the antenna signal towards the circulator) as well as to reflection of the transmitted signal over the antenna environment. The lower the level of the receive signal, the greater the problem of the level of self-interference.

One known solution for reducing the self-interference level in an IBFD transceiver is to use echo cancellation. This involves estimation, usually adaptive in nature, of the interfering signal on the receive channel from the transmitted signal. A number of transceiver architectures with digital and/or analogue mode echo cancellation have been proposed in the literature. In particular a description of a transceiver which uses hybrid analogue/digital echo cancellation is to be found in the article by D. Bharadia et al. entitled "Full Duplex Radios" published in Proc. of SIGCOMM '13, Hong Kong, August 2013.

Figure 1:
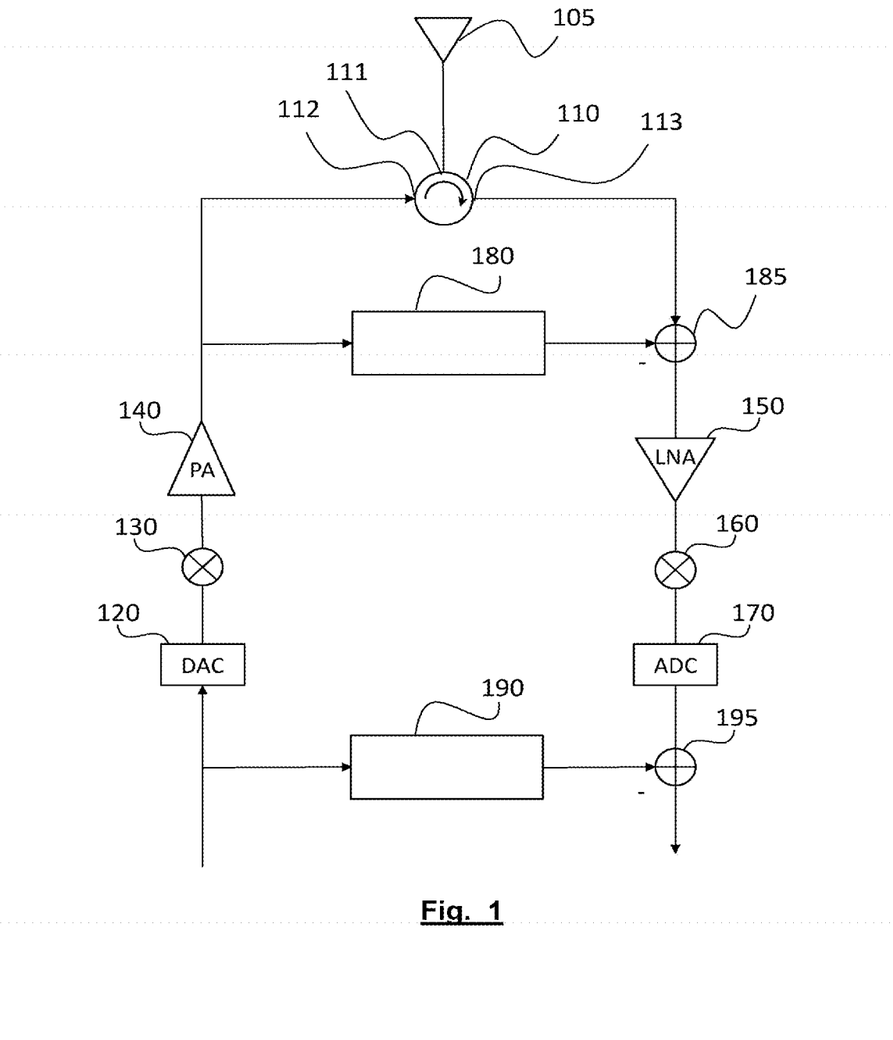
FIG. 1, already described, schematically shows an IBFD transmitter receiver with echo cancellation that is known in the current art.

A reminder of the structure of this transceiver is shown in FIG. 1. This comprises a circulator 110 comprising a common port 111 connected to a transceiver antenna 105, an input port 112 connected to the transmit channel and an output port 113 connected to the receive channel. The transmit channel comprises a digital/analogue converter 120 for supplying the baseband signal, a mixer 130 designed for transposition of the signal to an RF band and a power amplifier 140 supplying the amplified RF signal to the port 112 of the circulator. The receive channel comprises a low-noise amplifier 150 which receives the antenna signal, a mixer 160 to bring the RF signal to baseband and an analogue/digital converter 170 to convert this signal into a digital form.

A first echo-canceller operates at the RF stage on the analogue signal. This echo canceller comprises an adaptive filter 180 which estimates the interference due to the transmit signal. The interference is then subtracted from the RF signal received in 185 at the input to the low noise amplifier 150.

A second echo-canceller acts on the baseband on the digital signal. It comprises an adaptive filter 190 which estimates the residual interference due to the transmit signal. This residual interference is subtracted at 185 from the received signal, brought to baseband. By eliminating the majority of the self-interference, the first echo-canceller reduces the required input dynamic of the analogue/digital converter 170.

Although the levels of performance of such a transceiver are satisfactory in terms of isolating the transmit and receive channels (110 dB on 80 MHz of passband at 2.4 GHz), they are obtained at the cost of a relatively complex architecture.

Another solution for reducing self-interference in an IBFD transceiver involves the use of an antenna structure with several elements separated in spatial terms, or using the polarisation diversity in receive and transmit. This solution leads to a more complex antenna structure and to different antenna diagrams for transmit and for receive.

The aim of the present invention is consequently to remedy the aforementioned drawbacks, at least in part, in particular by proposing an in-band full-duplex transceiver with a simple structure whilst achieving a good level of isolation between the transmit and receive channels.

DESCRIPTION OF THE INVENTION

The present invention is defined by a transceiver using a given frequency band to simultaneously transmit a transmit ($S_{TX}^{out}$) signal and to receive a receive signal ($S_{RX}^{in}$), with the transceiver comprising:

a duplexer comprising an input port receiving a signal to be transmitted ($S_{TX}^{in}$), an output port supplying a received signal ($S_{RX}^{out}$) as well as a common port;

a bidirectional frequency transposition module comprising a first input/output connected to the common port of the duplexer as well as a second input/output which receives the receive signal ($S_{RX}^{in}$) and which supplies said received signal ($S_{RX}^{out}$), said frequency transposition module being suitable for transposing the signal to be transmitted ($S_{TX}^{in}$) by a predetermined frequency difference, $\Delta F$, to obtain the transmit signal ($S_{TX}^{out}$), and for transposing by the same frequency difference, the receive signal $S_{RX}^{in}$) in order to obtain the received signal ($S_{RX}^{out}$), the frequency band of the signal to be transmitted and the frequency band of the received signal thus being separated by a frequency gap which is double the predetermined frequency difference, the predetermined frequency difference $\Delta F$ being chosen such that $\Delta F > (B_{TX} + B_{RX})/4$ where $B_{TX}$ is the transmit signal band and $B_{RX}$ is the receive signal band.

Advantageously, the frequency transposition module comprises a first branch, known as the in-phase branch and an second branch, known as the quadrature branch, arranged in parallel between the first input/output and the second input/output, the in-phase branch comprising a first bidirectional mixer with a first local oscillator signal at frequency $\Delta F$, the quadrature branch comprising a Hilbert filter and a second bidirectional mixer with a second local oscillator signal at the frequency $\Delta F$, 90° in advance in relation to the first local oscillator signal.

The first and second local oscillator signals may be square clock signals, in which case the first and second bidirectional mixers are each made in the form of a switch which alternately short-circuits and applies a phase shift of 180° between its terminals.

The transceiver may in addition comprise a first power splitter/combiner comprising a first common terminal connected to the first input/output to receive a signal to be split or to supply a combined signal, and two terminals each to supply a split signal or to receive a signal to be combined, a first terminal of the first power splitter/combiner being connected to the in-phase branch and a second terminal of the first power splitter/combiner being connected to the quadrature branch.

The transceiver may in addition comprise a second power splitter/combiner comprising a second common terminal connected to the second input/output to receive a signal to be split or to supply a combined signal, and two terminals each to supply a split signal or to receive a signal to be combined, a first terminal of the second power splitter/combiner being connected to the in-phase branch and a second terminal of the second power splitter/combiner being connected to the quadrature branch.

The Hilbert filter is made, for example, using a quadrature hybrid coupler.

The second input/output of the frequency transposition module is advantageously connected to a transceiver antenna.

According to one specific embodiment, the input port of the duplexer is connected to a first elementary receive antenna and the output port of the duplexer is connected to a first elementary transmit antenna, with said first elementary transmit antenna and said first elementary receive antenna both being arranged on a first face of an insulating substrate.

The transceiver may furthermore comprise a second duplexer having a common port connected to the second input/output of the frequency transposition module, an output port connected to a second elementary transmit antenna and input port connected to a second elementary receive antenna, the second elementary transmit antenna and the second elementary receive antenna being arranged on a second face of the substrate, away from said first face.

The transceiver may comprise a controllable phase shifter between the second input/output of the frequency transposition module and the common port of the second duplexer.

BRIEF DESCRIPTION OF THE ILLUSTRATIONS

Other characteristics and advantages of the invention will appear on reading about a preferential embodiment of the invention, with reference to the attached figures, among which.

DETAILED DESCRIPTION OF PARTICULAR EMBODIMENTS

We will consider below an IBFD type transceiver as defined in the introduction part. This transceiver can transmit and receive over a cabled or wireless channel. In particular it can be equipment for a base station, a mobile terminal or a relay station.

The basic idea behind the present invention is to use a non-reciprocal frequency transposition bidirectional module between the propagation channel and the duplexer responsible for separating the transmit and receive channels.

The term bidirectional frequency transposition module means a module capable of transposing (or in an equivalent manner translating) the frequency of a signal to be transmitted in order to supply a transmit signal with a frequency shifted by $\Delta F_{TX}$ relative to the latter and conversely, transpose the frequency of a receive signal in order to provide a received signal with a frequency shifted by $\Delta F_{RX}$ relative to the latter. In the case of a wireless transmission, the transmit and receive signals are antenna signals, the signal to be transmitted and the received signals are respectively those at the input port and the output port of the duplexer.

The term reciprocal frequency transposition module refers to a transposition module that performs a frequency shift $\Delta F_{TX}$ on the transmit channel and a frequency shift $\Delta F_{RX} = -\Delta F_{TX}$ on the receive channel. Thus a signal to be transmitted which has a given frequency band that passes through said module on the transmit channel and which is reflected, passes once more through this same module on the receive channel and then occupies substantially the same frequency band as that of the signal to be transmitted.

Conversely, the term non-reciprocal frequency transposition module refers to a transposition module that performs a frequency shift $\Delta F_{TX}$ on the transmit channel and the same frequency shift $\Delta F_{RX} = \Delta F_{TX} = \Delta F$ on the receive channel. Thus a signal to be transmitted that passes through said module on the transmit channel and which is reflected, passes once more through this same module on the receive channel and then occupies a frequency band shifted by $2\Delta F$ relative to the band of the signal to be transmitted.

It will be understood that the transposition module is non-reciprocal in the sense that the function that it carries out is non-reciprocal. In other words, if $h_{Tx}$ is the module function in the transmit direction, and $h_{Rx}$ the module function in the receive direction, we obtain $h_{Rx} \circ h_{Tx} \neq \text{Id}$ where Id is the identity function.

Figure 2:
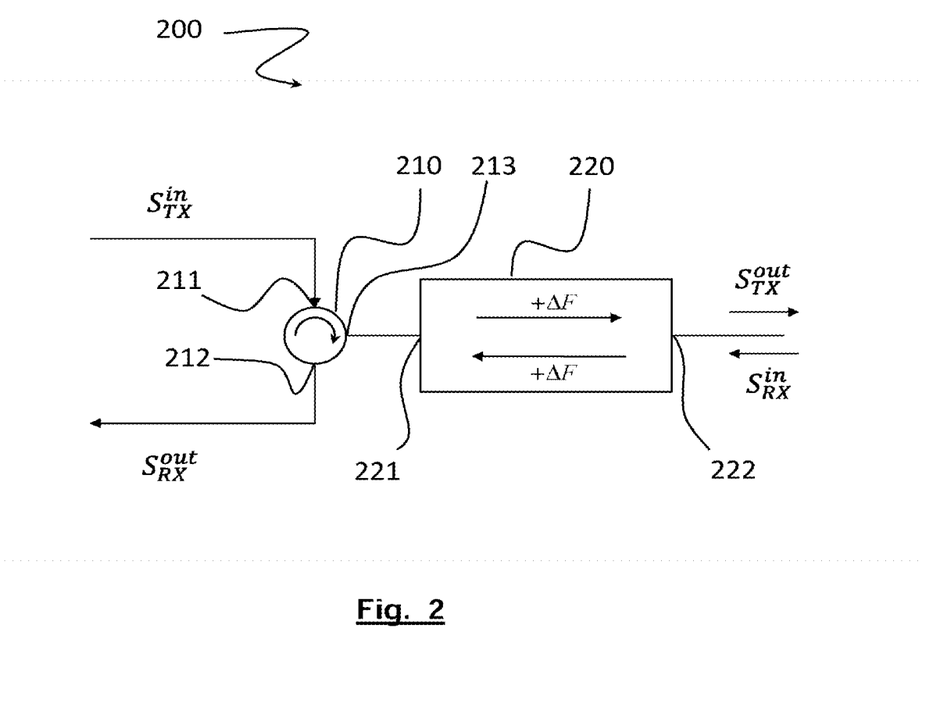
FIG. 2 schematically shows an IBFD transceiver according to a first embodiment of the invention.

FIG. 2 schematically shows an IBFD transceiver according to a first embodiment of the invention.

The transceiver comprises a duplexer, 210, comprising an input port, 211, receiving a signal to be transmitted, $S_{TX}^{in}$, an output port, 212, supplying a received signal, $S_{RX}^{out}$, and a common port, 213. The duplexer may be made in the form of a circulator in a manner that is known per se. It will be recalled that in a duplexer the signal at the input port is sent to the common port and that the signal arriving at the common port is sent to the output port.

The common port of the duplexer is connected to a first input/output, 221, of a non-reciprocal bidirectional frequency transposition module, 220. Thus this frequency transposition module receives at its first input/output the signal to be transmitted, $S_{TX}^{in}$, and supplies the received signal $S_{RX}^{out}$, at this same input/output. This transposition module furthermore comprises a second input/output, 222, which receives said receive signal, $S_{RX}^{in}$ and which supplies the transmit signal, $S_{TX}^{out}$. In the case of a wireless communications system, the second input/output may be directly connected to the antenna. It can be seen that with the preceding notation conventions $S_{TX}^{out} = h_{Tx}(S_{TX}^{in})$ and $S_{RX}^{out} = h_{Rx}(S_{RX}^{in})$.

As seen above, the frequency transposition module is suitable for transposing the signal to be transmitted, $S_{TX}^{in}$, with a predetermined shift, $\Delta F$, to obtain the transmit signal, $S_{TX}^{out}$, and for transposing, with the same frequency shift, the receive signal $S_{RX}^{in}$, in order to obtain the received signal, $S_{RX}^{out}$, with the frequency band of the signal to be transmitted and the frequency band of the received signal thus being separated by a frequency shift which is double said predetermined frequency shift.

The frequency shift $\Delta F$ is advantageously chosen such that $\Delta F > B/2$ where B is the transmit signal band and the receive signal band. If these signal bands are different, $\Delta F > (B_{TX} + B_{RX})/4$ is chosen where $B_{TX}$ is the transmit signal band and $B_{RX}$ is the receive signal band. In the case of this condition not being verified, the frequency separation of the transmit and receive bands is imperfect and a second embodiment described below may be adopted.

It will be understood that from the viewpoint of ports 211 and 212 of the duplexer, the transceiver behaves as a full-duplex FDD communication device, and that conversely, from the viewpoint of input/output 222 of the frequency transposition module, the latter behaves as an IBFD communications device. The transceiver thus exhibits at the same time both the advantages of FDD communication, namely low levels of self-interference because of the frequency separation of the transmit and receive bands, and the advantages of IBFD communication, namely low spectral occupation.

Figure 3A:
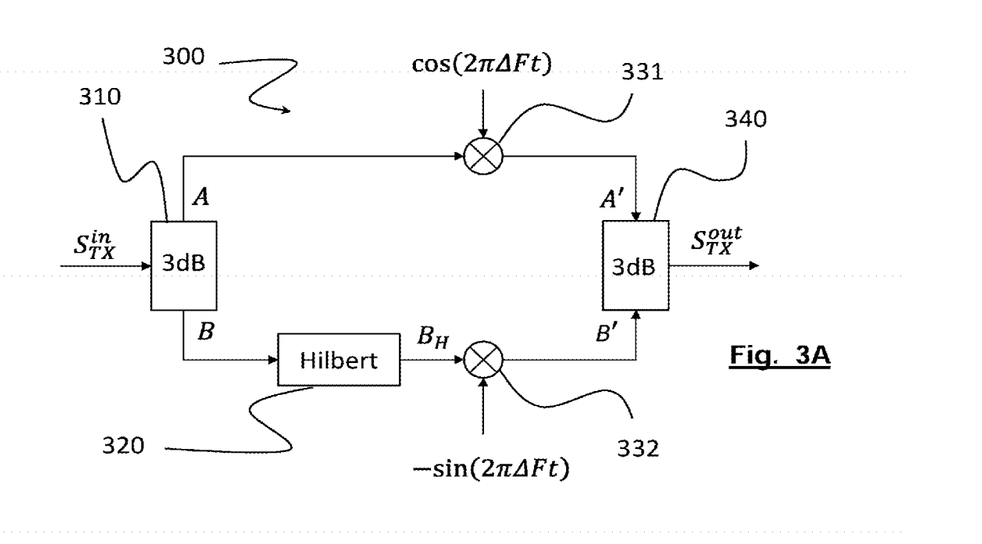
FIG. 3A schematically shows an example of a non-reciprocal frequency transposition module operating in transmit mode.

FIG. 3A schematically shows an example of a non-reciprocal frequency transposition module, operating in transmit.

The frequency transposition module 300 comprises a first bidirectional power splitter/combiner (a 2-way power splitter/combiner), 310, which splits the signal to be transmitted $S_{TX}^{in}$ into two signals A and B of the same amplitude $$\frac{\sqrt{2}}{2} S_{TX}^{in}$$

(because of the conservation of power) and with the same phase.

The signal A is multiplied in a first bidirectional mixer 331 with the function cos $(2\pi\Delta Ft)$.

The signal B is supplied to a bidirectional Hilbert filter, 320, and the signal filtered in this way, $B_H$, is multiplied with the function $-\sin(2\pi\Delta Ft)$ in a second bidirectional mixer 332. It will be noted that the order of the Hilbert filter and the bidirectional mixer 332 may be reversed (on condition that the validity band of the filter in question covers the spectrum before and after transposition). One embodiment example of a bidirectional Hilbert filter will be described later. It should be recalled here that the ideal transfer function of a Hilbert filter is $H(f) = -j \, \text{sgn}(f)$ where sgn(.) is the sign function, equivalent to $-1$ if the argument is negative and $+1$ if the argument is positive and 0 if the argument is zero. In practice the Hilbert filter is only applied over a predetermined validity band which includes that of the signal passing through it. It will be recalled that the Hilbert transform of a real signal is also real.

An example of a bidirectional mixer is described in document U.S. Pat. No. 8,036,627 included here by reference.

In the example shown, it will be seen that the signal at the input to the mixers 331 and 332 may be considered to be the representation of an analytical signal $\tilde{A} = A + jB_H$. Mixers 331 and 332 supply two components which are used to calculate the real part of the complex signal $\tilde{A}e^{j2\pi\Delta Ft}$, that is, a signal transposed by a frequency of $\Delta F$.

Signals A' and B' at the output of mixers 331 and 332 respectively are then combined in a second power splitter/combiner 340, with a structure identical to that of the first power divider/combiner 310. The amplitude of the transmit signal at the output of the second power splitter/combiner 340 is therefore $$S_{TX}^{out} = \frac{\sqrt{2}}{2}(A' + B').$$

This transmit signal is then sent to the cabled or wireless propagation channel.

Figure 3B:
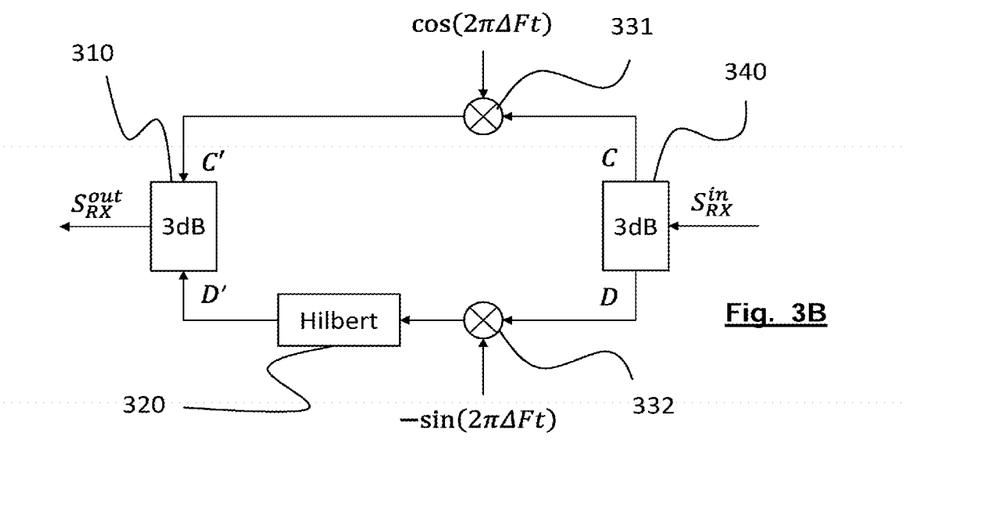
FIG. 3B schematically shows an example of a non-reciprocal frequency transposition module operating in receive mode.

FIG. 3B schematically shows an example of a non-reciprocal frequency transposition module operating in reception.

The receive signal $S_{RX}^{in}$ is split in the second power splitter/combiner 340 into two identical signals C and D with the same amplitude $$\frac{\sqrt{2}}{2} S_{RX}^{in}$$

(due to the conservation of power) and with the same phase. The signal C is multiplied in the first bidirectional mixer 331 with the function cos $(2\pi\Delta Ft)$.

The signal D is multiplied with the function $-\sin(2\pi\Delta Ft)$ in the second bidirectional mixer 332, and then supplied to the bidirectional Hilbert filter, 320.

The signal at the input to the mixers 331 and 332 may be considered to be the representation of a complex signal $\tilde{C} = C + jD$. Mixers 331 and 332 supply a complex signal $\tilde{C}e^{2\pi\Delta\Delta Ft}$, that is, this is also a signal whose frequency is transposed by $+\Delta F$.

Signals C' and D' at the output of mixers 331 and 332 respectively are then combined in the first power splitter/combiner 310 to give the received signal $$S_{RX}^{out} = \frac{\sqrt{2}}{2}(C' + D').$$

It has been stated that bidirectional mixers 331 and 332 were suitable for carrying out a multiplication with signals cos $(2\pi\Delta Ft)$ and $-\sin(2\pi\Delta Ft)$. These signals may be obtained from a local oscillator at the frequency $\Delta F$ and a 90° phase shifter. Alternatively, square clock signals could be used at the same frequency, in quadrature. They may be obtained simply from a square clock signal at the frequency 2ΔF. The use of square signals has the drawback of generating harmonics, but in practice the bandpass character of the components removes these to a large extent. The use of square signals on the other hand considerably simplifies the execution of the bidirectional mixers. In effect, the application of phase states +1 and −1 can then be simply achieved by switching, or not, the signal to be mixed onto a delay line which corresponds to a phase shift of the carrier by 180°

Figure 4:
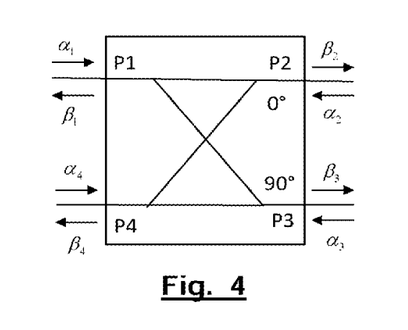
FIG. 4 shows a quadrature hybrid coupler suitable for making a Hilbert filter in the non-reciprocal frequency transposition module in FIGS. 3A and 3B.

The first power splitter/combiner 310 as well as the Hilbert filter 320 may be made by means of a Quadrature Hybrid Coupler as shown in FIG. 4.

Such a coupler is a device with four ports $P_1, \ldots, P_4$. So $\alpha_1, \ldots \alpha_4$ and $\beta_1, \ldots, \beta_4$ are respectively the complex amplitudes of input and output signals relating to ports $P_1, \ldots, P_4$. The vectors $\alpha = (\alpha_1\ \alpha_2\ \alpha_3\ \alpha_4)^T$ and $\beta = (\beta_1\ \beta_2\ \beta_3\ \beta_4)^T$ are linked by the matrix of parameters S of the coupler:

$$\beta = S\alpha$$

where the matrix S has the following form:

$$S = \frac{1}{\sqrt{2}} \begin{pmatrix} 0 & 1 & j & 0 \\ 1 & 0 & 0 & j \\ j & 0 & 0 & 1 \\ 0 & j & 1 & 0 \end{pmatrix}$$

The port $P_1$ is connected to the first input/output of the frequency transposition module where $\alpha_1 = S_{TX}^{in}$ and $\beta_1 = S_{RX}^{out}$, port $P_2$ is connected to the first bidirectional mixer, port $P_3$ is connected to the second bidirectional mixer and port $P_4$ is connected to a matched impedance.

Figure 5:
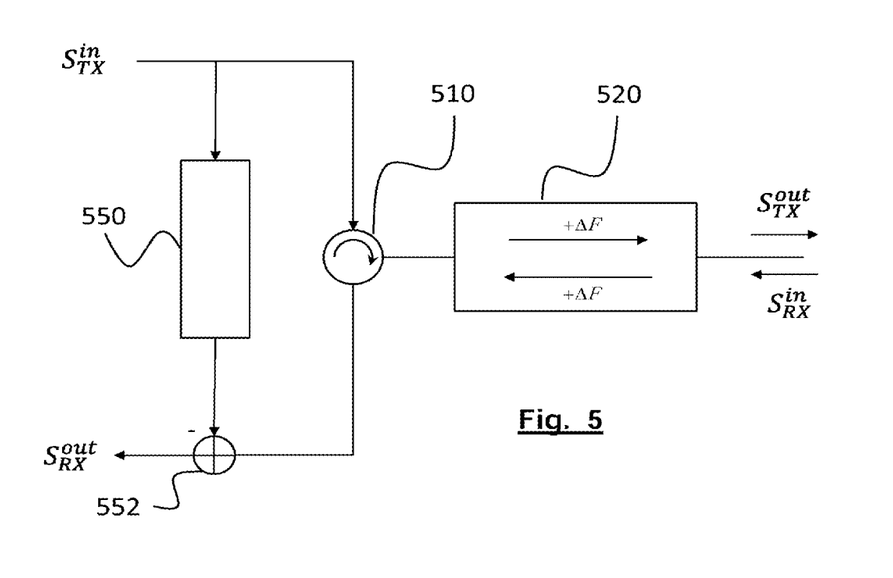
FIG. 5 schematically shows a transceiver according to a second embodiment, useful for understanding the invention.

FIG. 5 schematically shows a second embodiment which does not form part of the present invention.

References 510 and 520 designate the same elements as elements 210 and 220 of FIG. 2. The transceiver in FIG. 1 however is distinguished from that of FIG. 2 by the presence of an echo canceller 550 arranged between the input and the output ports of the duplexer 510. More precisely, a filter 550 receives the signal to be transmitted $S_{TX}^{in}$ at its input and at its output provides an estimate of the self-interference. The self-interference is subtracted at 552 from the received signal $S_{RX}^{out}$. This embodiment is more complex than the first but increases the rejection rate of the residual self-interference. In particular, when the condition $\Delta F > (B_{TX} + B_{RX})/4$ is not achieved and the transmit and receive bands partially overlap this embodiment may be implemented to eliminate residual self-interference.

Figure 6:
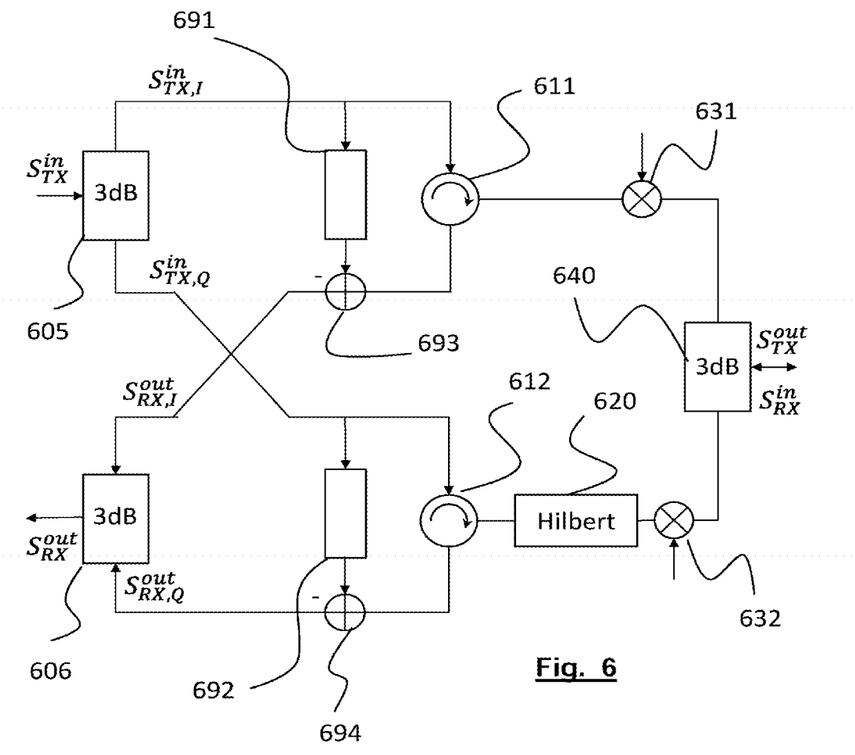
FIG. 6 schematically shows a transceiver according to one alternative of FIG. 5.

FIG. 6 schematically shows a transceiver according to one alternative of FIG. 5.

Unlike FIG. 5, the transceiver according to this alternative comprises an echo canceller on each of the in-phase and quadrature branches.

More precisely the signal to be transmitted $S_{TX}^{in}$ is split into two signals of the same amplitude in a first power splitter/combiner 605 to provide two signals $S_{TX,I}^{in}$, and $S_{TX,Q}^{in}$, the first being intended for the in-phase branch and the second for the quadrature branch. Symmetrically, the signals $S_{RX,I}^{out}$ and $S_{RX,Q}^{out}$ emerging respectively from the in-phase and quadrature branches are combined in a third power splitter/combiner 606 to form the received signal $S_{RX}^{out}$.

A first duplexer, 611, is provided in the in-phase branch of the transceiver. It receives the signal $S_{TX,I}^{in}$ at its input port and supplies the signal $S_{RX,I}^{out}$ at its output port. Its common port is connected to the first bidirectional mixer 631.

Similarly, a second duplexer, 612, is provided in the quadrature branch of the transceiver. It receives the signal $S_{TX,Q}^{in}$ at its input port and supplies the signal $S_{RX,Q}^{out}$ at its output port. Its common port is connected to the second bidirectional mixer 632 after passing through the Hilbert filter 620.

The first and second bidirectional mixers are in addition connected to the power splitter/combiner 640 as in the first embodiment.

A first echo canceller, 691, is provided between the transmit and receive channels of the in-phase branch. This receives the signal $S_{TX,I}^{in}$ as an input and supplies an estimate of the self-interference on the in-phase branch. This self-interference is subtracted at 693 from the signal $S_{RX,I}^{out}$.

A second echo canceller, 692, is provided between the transmit and receive channels of the quadrature branch. This receives the signal $S_{TX,Q}^{in}$ as an input and supplies an estimate of the self-interference on the quadrature branch. This self-interference is subtracted at 694 from the signal $S_{RX,Q}^{out}$.

The first and second echo cancellers 691, 692 may be implemented in analogue mode or in digital mode or in accordance with a hybrid analogue/digital architecture as described in the introductory section.

The power splitters/combiners 605 and 606 may also be made digital, in which case the signals $S_{TX,I}^{in}$, $S_{TX,Q}^{in}$, $S_{RX,I}^{out}$, $S_{RX,Q}^{out}$ are themselves digital. If it is assumed that the mixers 631, 632 and the Hilbert filter 620 are free of imperfections the same digital samples of $S_{TX}^{in}$ are supplied to the respective inputs of echo cancellers 691 and 692. The power combiner 606 may also be replaced by a simple adder of the digital samples and of the signals $S_{RX,I}^{out}$ and $S_{RX,Q}^{out}$. This second alternative reduces the losses to 3 dB instead of the 6 dB of the first. Furthermore this architecture allows quadrature errors (phase and amplitude) to be compensated in the mixers 631, 632 and the Hilbert filter 620. In effect, in the event of RF imperfections, the samples $S_{TX,I}^{in}$, $S_{TX,Q}^{in}$ sent over the quadrature channels are different. They are produced from filtering which compensates as much as possible for phase and gain errors in both branches. In receive the signals $S_{RX,I}^{out}$ and $S_{RX,Q}^{out}$ are also combined by linear filtering to compensate for these errors as much as possible. These filtering actions can be achieved during a calibration phase using conventional techniques.

Figure 7A:
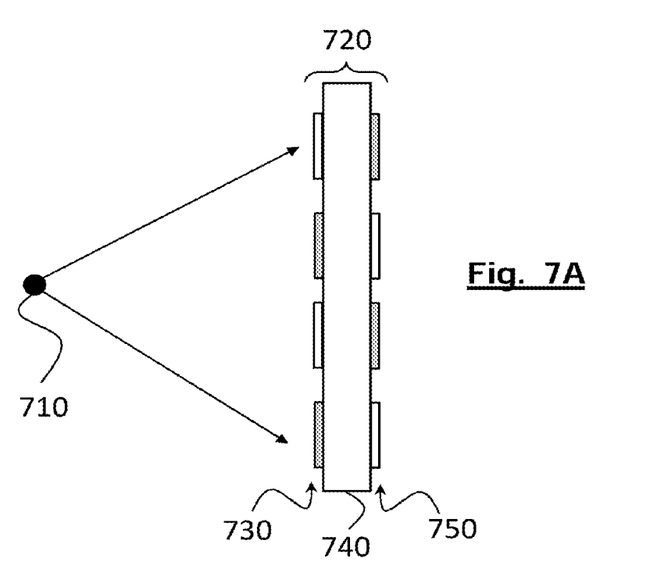
FIGS. 7A and 7B show a profile view and rear view of an array of double-sided phase control antennae which use a plurality of transceivers according to one example embodiment of the invention.

FIG. 7A represents a profile view of an array of double-sided phase control antennae which use a plurality of transceivers according to one embodiment example of the invention.

An RF source, 710, transmits a wave in the direction of the rear face of an array of double-sided antennas, 720. This array of double-sided antennas is comprised of a first planar array, 730, located on the rear face of a substrate 740, and of a second planar array, 750, located on the front face of this same substrate. The substrate may be comprised of two layers of substrate separated by a ground plane as described in application US-A-2103/0271346 included here for reference purposes. In general, in such an array of double-sided antennae (transmitter array) the elementary antennae of the first array and the elementary antennae of the second array are connected by elementary phase-shifters in such a way that the wave received by an elementary antenna of the first array is phase-shifted by an elementary phase shifter before it is transmitted by the corresponding elementary antenna of the second array. Such an array of double-sided antennas are used to dynamically align the transmit/receive beam by controlling the various elementary phase-shifts, or to form a beam in accordance with a predefined template.

Figure 7B:
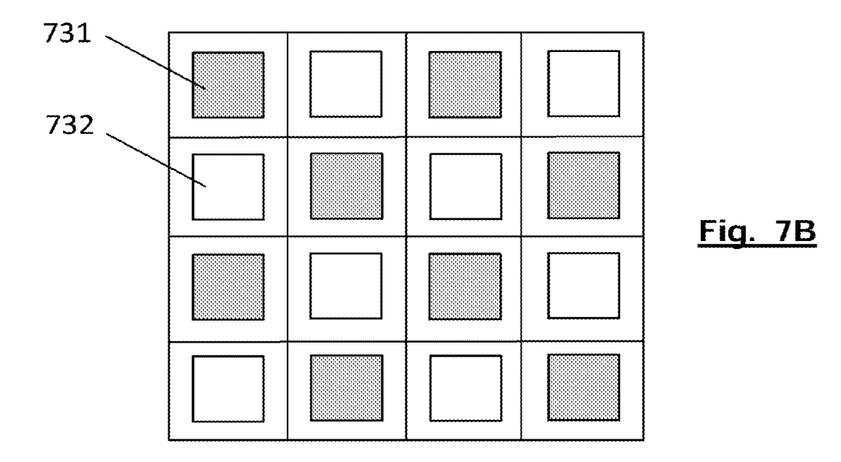

In the present case, the first array 730 is comprised of a first sub-array 731 and of a second sub-array 732 of elementary antennas, the elementary antennas of the first and second sub-arrays being, for example, arranged in a staggered manner as shown in FIG. 7B which shows the rear face of the array of double-sided antenna 720. Symmetrically, the second array 750 on the front face of the substrate is made up of a third sub-array and of a fourth sub-array of elementary antennas arranged in a staggered arrangement. The first and second sub-arrays are respectively dedicated to receive and to transmit. Similarly the third and fourth sub-arrays are respectively dedicated to transmit and to receive.

Figure 8:
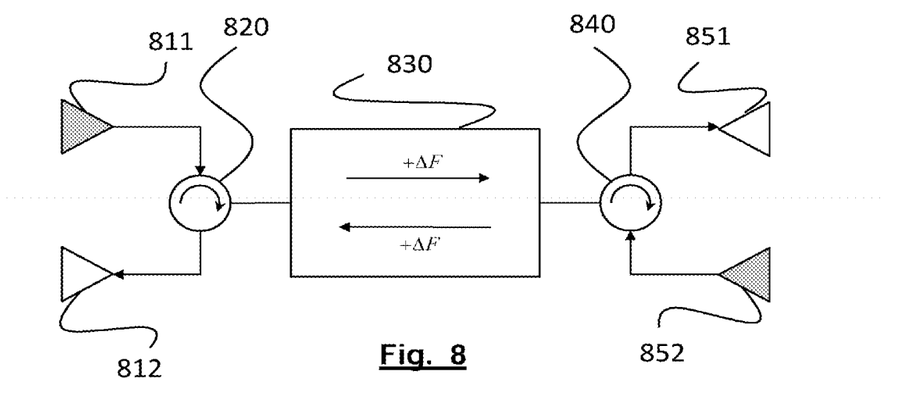
FIG. 8 shows a first embodiment example of a transceiver used in FIGS. 7A and 7B.

Unlike the array of double-sided antennae known in the prior art, transceivers according to an embodiment of the invention couple the elementary antennae of the first array with those of the second array as shown in FIG. 8.

This figure shows an elementary antenna, 811, belonging to the first sub-array, and a neighbouring elementary antenna, 812, belonging to the second sub-array. Antennas 811 and 812 are respectively connected to the input and output ports of a first duplexer 820. The common port of the duplexer 820 is connected to the first input/output of a non-reciprocal frequency transposition module 830 as described in relation to reference 220 of FIG. 2. The second input/output from the non-reciprocal frequency transposition module is connected to the common port of a second duplexer 840. Its output port is furthermore connected to an elementary antenna 851 of the third sub-array and its output port to a neighbouring elementary antenna 852 of the fourth sub-array.

Thus viewed from the rear face of the double-sided array, the communication with the source is of the FDD type, the receive frequency band of the sub-array 1 being shifted by $2\Delta F$ from the transmit frequency band of the sub-array 2. On the other hand, viewed from the front face of the double-sided array the communication is of the IBFD type.

Figure 9:
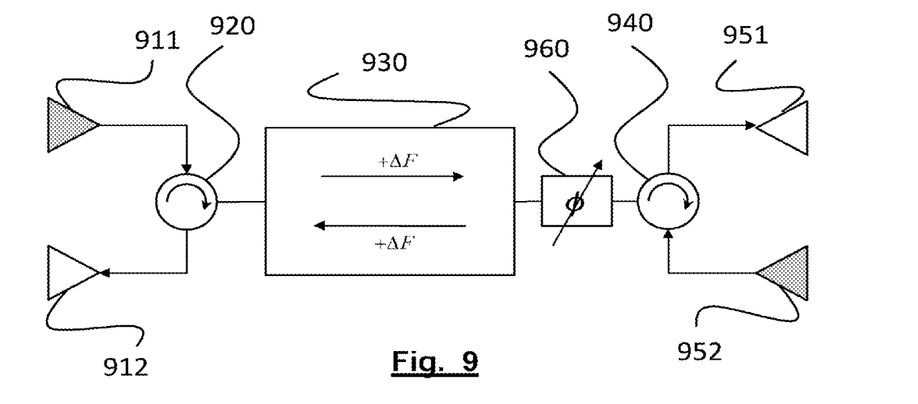
FIG. 9 shows a second embodiment example of a transceiver used in FIGS. 7A and 7B.

FIG. 9 shows a second example of a transceiver which can be used in the double-faced antennae array of FIGS. 7A and 7B.

The elements 911-952 shown in FIG. 9 are identical to the elements 811-852 of FIG. 8. This embodiment example is, on the other hand, distinguished from the previous in that it comprises in addition a controllable elementary phase-shifter 960 between the second input/output of the frequency transposition module 930 and the second duplexer 940. Thus, by appropriately varying the phase-shifting of the various elementary phase-shifters in the transceivers, the IBFD communication beam may be pointed in the desired direction. If necessary, two elementary phase shifters for each of the transmit and receive channels may be envisaged, instead of the single elementary phase shifter 960. The IBFD communication transmit and receive beams may then be pointed independently of each other.

The invention claimed is:

1. A transceiver using a given frequency band to simultaneously transmit a transmit signal and to receive a receive signal, comprising:
   a duplexer comprising an input port receiving a signal to be transmitted, an output port supplying a received signal as well as a common port;
   a bidirectional frequency transposition module comprising a first input/output connected to the common port of the duplexer as well as a second input/output which receives the receive signal and which supplies said received signal, said frequency transposition module being suitable for transposing, the signal to be transmitted by a predetermined frequency difference, $\Delta F$, in order to obtain the transmit signal, and to transpose the receive signal by the same frequency difference, in order to obtain the received signal, the frequency band of the signal to be transmitted and the frequency band of the received signal thus being separated by a frequency gap which is double said predetermined frequency difference, the predetermined frequency difference $\Delta F$ being chosen such that $\Delta F > (B_{TX} + B_{RX})/4$ where $B_{TX}$ is the transmit signal band and $B_{RX}$ is the receive signal band.

2. The transceiver according to claim 1, wherein the frequency transposition module comprises a first branch, known as the in-phase branch and a second branch, known as the quadrature branch, arranged in parallel between the first input/output and the second input/output, the in-phase branch comprising a first bidirectional mixer with a first local oscillator signal at frequency $\Delta F$, the quadrature branch comprising a Hilbert filter and a second bidirectional mixer with a second local oscillator signal at the frequency $\Delta F$, 90° in advance in relation to the first local oscillator signal.

3. The transceiver according to claim 2, wherein the first and second local oscillator signals are square clock signals, the first and second bidirectional mixers are each made in the form of a switch which in an alternating manner short-circuits and applies a phase shift of 180° degrees between its terminals.

4. The transceiver according to claim 2, further comprising a first power splitter/combiner comprising a first common terminal connected to the first input/output to receive a signal to be split or to supply a combined signal, and two terminals to each supply a split signal or to receive a signal to be combined, a first terminal of the first power splitter/combiner being connected to the in-phase branch and a second terminal of the first power splitter/combiner being connected to the quadrature branch.

5. The transceiver according to claim 2, further comprising a second power splitter/combiner comprising a second common terminal connected to the second input/output to receive a signal to be split or to supply a combined signal, and two terminals to each supply a split signal or to receive a signal to be combined, a first terminal of the second power splitter/combiner being connected to the in-phase branch and a second terminal of the second power splitter/combiner being connected to the quadrature branch.

6. The transceiver according to claim 2, wherein the Hilbert filter is made using a quadrature hybrid coupler.

7. The transceiver according to claim 1, wherein the second input/output of the frequency transposition module is connected to a transceiver antenna.

8. The transceiver according to claim 1, wherein the input port of the duplexer is connected to a first elementary receive antenna and that the output port of the duplexer is connected to a first transmit elementary antenna, said first elementary transmit antenna and said first elementary receive antenna both being arranged on a first face of an insulating substrate.

9. The transceiver according to claim 8, further comprising a second duplexer having a common port connected to the second input/output of the frequency transposition module, an output port connected to a second elementary transmit antenna and an input port connected to a second elementary receive antenna, the second elementary transmit antenna and the second elementary receive antenna being arranged on a second face of the substrate, away from said first face.

10. The transceiver according to claim 9, further comprising a controllable phase shifter between the second input/output of the frequency transposition module and the common port of the second duplexer.

* * * * *